United States Patent [19]

Webb et al.

[11] Patent Number: 5,075,150

[45] Date of Patent: Dec. 24, 1991

[54] PACK OF LAMINATIONS WITH PROJECTIONS AND DEPRESSIONS IN TORSIONALLY FLEXIBLE CONTACT

[75] Inventors: Charles H. Webb, Bilston; William G. French, Swindon, both of England

[73] Assignee: Linton and Hirst, Swindon, England

[21] Appl. No.: 607,602

[22] Filed: Oct. 31, 1990

Related U.S. Application Data

[63] Continuation of Ser. No. 280,143, Dec. 5, 1988, abandoned.

[51] Int. Cl.⁵ .......................... B32B 3/30; H02K 1/06; H01F 27/26

[52] U.S. Cl. .................................... 428/162; 428/156; 428/594; 428/582; 428/597; 428/636; 428/64; 428/161; 428/164; 428/172; 428/174; 428/179; 428/131; 428/132; 428/133; 428/100; 428/213; 428/223; 428/457; 336/234; 336/211; 310/259; 310/217; 310/216

[58] Field of Search ............... 428/156, 594, 582, 597, 428/636, 162, 64, 161, 164, 172, 174, 179, 131, 132, 133, 100, 213, 223, 457; 336/234, 211; 310/259, 217, 216; 29/609

[56] References Cited

U.S. PATENT DOCUMENTS

| | | | |
|---|---|---|---|
| 2,545,528 | 3/1951 | Murray | 428/64 X |
| 2,588,727 | 3/1957 | Howard | 428/64 X |
| 2,671,951 | 3/1954 | Sliwiak | 29/609 |
| 2,975,312 | 3/1961 | Ploran | 310/217 |
| 3,202,851 | 8/1965 | Zimmerle et al. | 310/217 X |
| 3,203,077 | 8/1965 | Zimmerle . | |
| 4,110,895 | 9/1978 | Mitsui | 29/609 X |
| 4,149,136 | 4/1979 | Philberth et al. | 336/234 X |
| 4,160,182 | 7/1979 | Mitsui | 310/217 X |
| 4,264,663 | 3/1981 | Beenken | 428/582 X |
| 4,364,169 | 12/1982 | Kawano et al. . | |
| 4,538,345 | 9/1985 | Diederichs | 29/609 X |
| 4,728,842 | 3/1988 | Martin | 29/609 X |
| 4,827,237 | 5/1989 | Blackburn | 336/234 X |

FOREIGN PATENT DOCUMENTS 857915 1/1961 United Kingdom .

*Primary Examiner*—Ellis P. Robinson
*Assistant Examiner*—William P. Watkins, III
*Attorney, Agent, or Firm*—Richard M. Goldberg

[57] ABSTRACT

In one embodiment, the pack is torsionally flexible. Pack of laminations comprises laminations which are connected one to another by only a single connection. The single connection is provided by a projection which projects into a depression. The projection has a height which is greater than 50% of the thickness of the lamination and the depression has a depth which is greater than 50% of the thickness of the lamination. The depression and projection are produced by a projection punch which cooperates with a die. The die has a lip which is either radiussed (r) or conical (C) and the punch causes the metal of the lamination to be extruded past the lip into the die while the depression is being formed. The radiussed or conical lip allows the height of the projection and the depth of the depression to be greater than the normal 50% shear stress fracture depth/height.

7 Claims, 5 Drawing Sheets

PACK OF LAMINATIONS WITH PROJECTIONS AND DEPRESSIONS IN TORSIONALLY FLEXIBLE CONTACT

This application is a continuation, of application Ser. No. 07/280,143, filed Dec. 5, 1988 now abandoned.

FIELD OF THE INVENTION

The present invention in one aspect relates to:

a pack of laminations for an electromagnetic device;

a lamination for use in the pack;

a method of making such a pack;

apparatus for making the pack; and an electromagnetic device comprising the pack.

The present invention in another aspect relates to forming projections and depressions.

BACKGROUND TO THE INVENTION

Various methods have been proposed to make packs or stacks of laminations for electromagnetic devices. In one known method, each lamination is rigidly connected to its adjacent lamination by a plurality of connections. Each connection, however, disrupts the flux paths. In addition, when two such packs are placed face to face, air gaps are invariably present between the pole core faces defined by the packs. Because of the disruption of the flux paths and the presence of the air gaps, there are problems in meeting electromagnetic specifications for devices. One previously proposed solution to that problem is to use higher quality material but that increases the cost. Another previously proposed solution is to use unconnected plates or laminations but that increases the cost due to the need for expensive assembly equipment.

SUMMARY OF THE INVENTION

In accordance with one aspect of the present invention, there is provided a pack or stack of connected laminations, which pack is torsionally flexible.

In an embodiment each lamination is connected to an adjacent lamination by a single connection.

It is known to connect laminations using projections on laminations projecting into depressions on adjacent laminations. Such projections and depressions are punched out of the laminations. They have a height or depth of about 50% or less of the thickness of the lamination. When the projection/depression punched out of the lamination has a height/depth of about 50% of the thickness of the lamination, the condition is approached at which the projection/depression will break away from the lamination. The present inventors have realised that it would be advantageous to produce projections/depressions of height/depth greater than 50% of the lamination thickness.

According to another aspect of the present invention, there is provided a method of forming a projection and/or depression in a sheet of ductile material, the method comprising applying a punch to the material to extrude the projection past the lip of, and into, a projection forming die, the lip being radiussed or conical.

In an embodiment of the method the height of the projection and/or the depth of the depression so produced is about 65% to about 70% of the material thickness.

The projection and/or depression made by the method of another aspect is used in embodiments of the said one aspect. It may however be used in other situations to connect laminations.

Other aspects of the present invention are set out in the accompanying claims to which attention is directed.

BRIEF DESCRIPTION OF THE DRAWINGS

For a better understanding of the present invention and to show how the same may be carried into effect reference will now be made, by way of example, to the accompanying drawings in which.

DETAILED DESCRIPTION OF PREFERRED EMBODIMENTS

Figure 1:
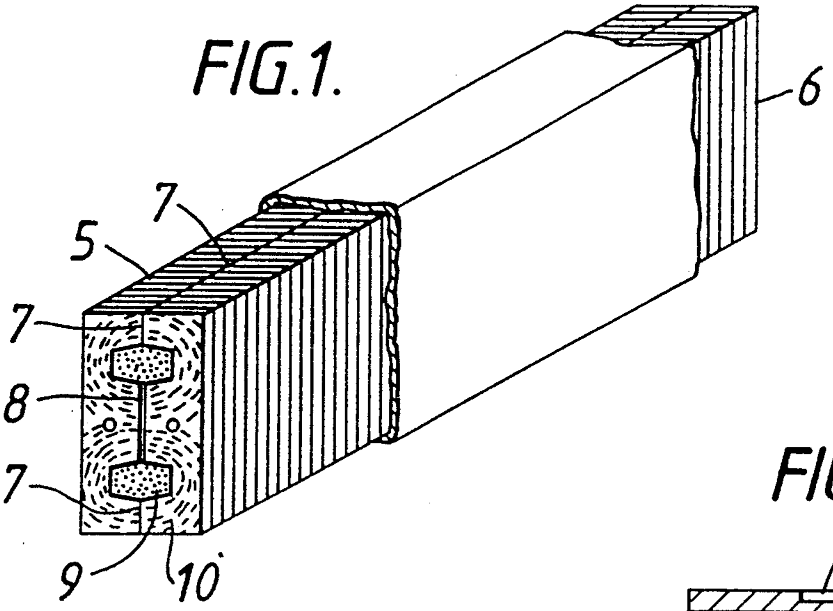
FIG. 1 is a perspective view of an electromagnetic device comprising two lamination packs or stacks, each pack being in accordance with the present invention.

Referring to FIG. 1, the electromagnetic device is e.g. a choke assembly which comprises two packs of "E-shaped" laminations each pack comprising laminations 5 stacked on partitioning plates 6. The faces of the limbs of the "E-shaped" laminations define pole faces 7. The two packs are placed with their pole faces abutting. The central limbs of the laminations are spaced apart by an air gap 8 of predetermined width. An induction coil 9 produces magnetic flux 10 in the laminations.

If the laminations were connected one to another rigidly by a plurality of connections, there would inevitably be air gaps between the abutting pole faces 7. Furthermore the plurality of connections would disrupt the flux paths.

In accordance with an embodiment of one aspect of the present invention, in each pack, each lamination is connected to its adjacent lamination by only a single connection producing a torsionally flexible pack. Thus, when two packs are butted as shown in FIG. 1 the torsional flexibility allows at least the reduction if not the elimination of unwanted air gaps between the pole faces 7. In addition the reduction of the number of connections between laminations reduces the disruption of the flux paths. The result is increased electrical efficiency as compared with packs of laminations which are made of the same quality of material but with laminations rigidly connected by a plurality of connections. The electrical efficiency is comparable with that obtained by the use of loose (unconnected) plates but at less cost.

Figure 2:
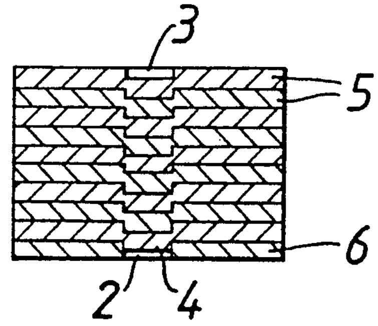
FIG. 2 is a cross-sectional view of part of one of the packs of FIG. 1, the pack including a partitioning plate.

Referring to FIG. 2, each lamination comprises a single depression 3 and a single projection 4 aligned on a common axis perpendicular to the lamination. The projection of one lamination projects into the depression of its adjacent lamination. A pack of such laminations 5 is built up on a lamination 6 referred to herein as a partitioning plate 6 which comprises a through-hole 2 in place of the depression 3/projection 4 combination. The projection 4 of the bottom most lamination 5 projects into the hole 2.

The pack of laminations, in accordance with an embodiment of said one aspect of the present invention, in which the laminations are connected one to another by only the single projection/depression, must withstand the stresses applied by subsequent production processes, including high temperature heat treatment, and also radial movement to provide the packs with the torsional flexibility which allows the magnetic pole faces 7 to butt together without air gaps throughout the pack length thus maintaining the predetermined air gap 8 (when applicable). In order to achieve that, the depressions and projections of the laminations have the form shown in FIGS. 3 and 4.

The depression 3 in each lamination has a depth P of about 69% of the thickness T of the material of the lamination. The lip of the depression 3 is radiussed with a radius R. The depression is circularly cylindrical. The internal diameter of the depression is less than the diameter of the corresponding projection to produce an interference fit.

Figure 3:
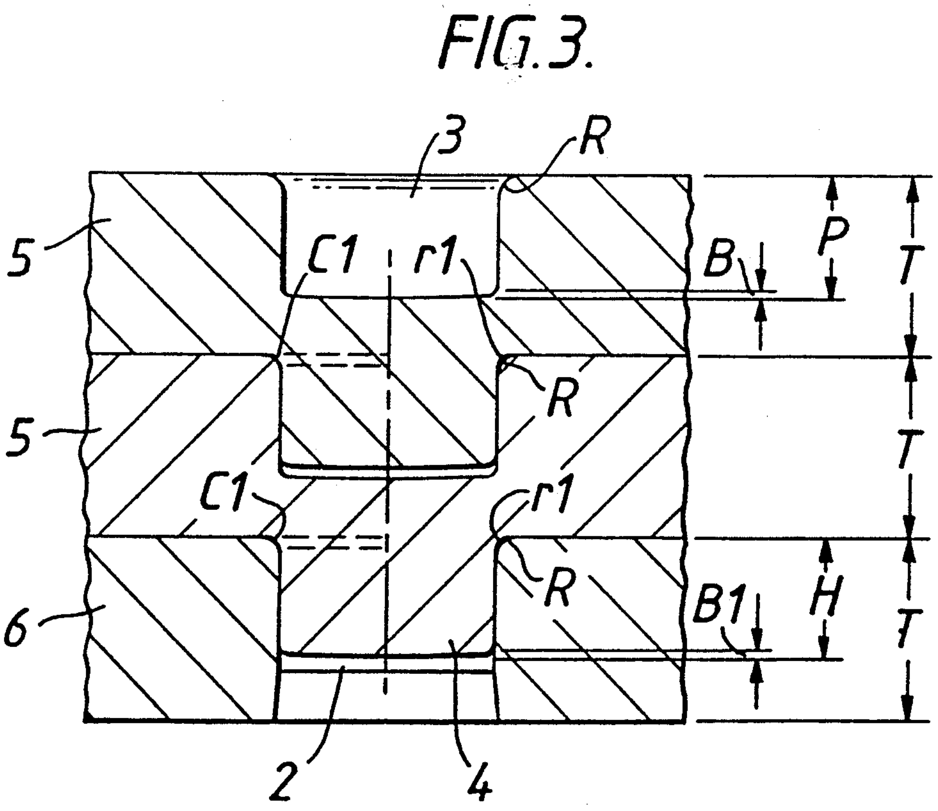
FIG. 3 is partial cross-sectional view showing, in greater detail, the manner of interconnection of laminations of the pack of FIG. 2.
Figure 4:
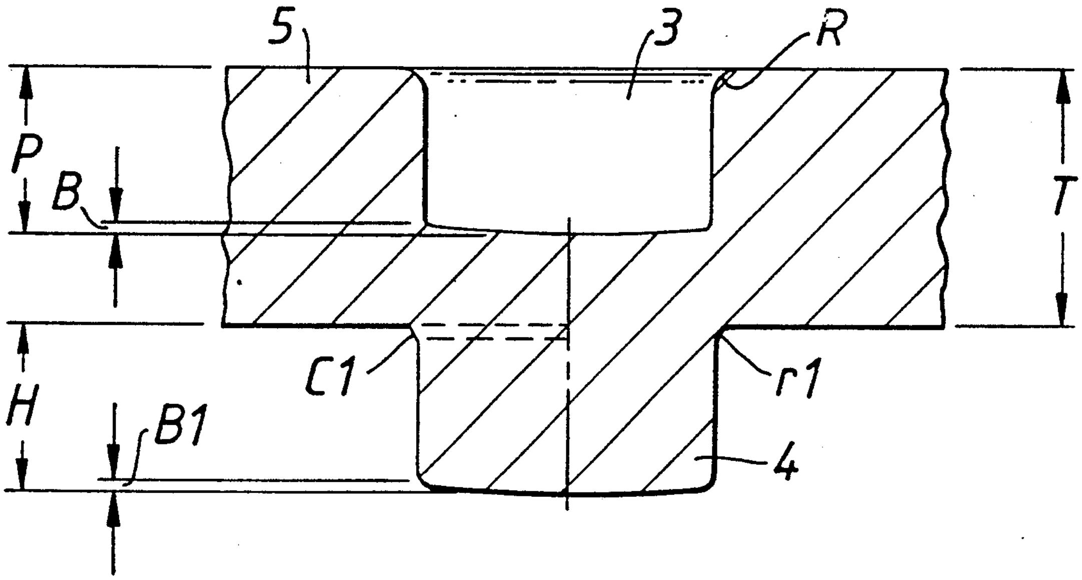
FIG. 4 is a partial cross-sectional view of a single lamination showing further details of a depression and projection.

The projection 4 which is circularly cylindrical, has a height H which is about 65% of the material thickness T. The base of the projection 4 is either:

a) radiussed with a radius r1 as shown in the right hand portion of FIG. 3 radius r1 being less than the radius R of the lip of the depression; or b) in the shape of a truncated cone C1 of similar size to the radiussed base r1 as shown in the left hand portion of FIG. 3.

The cone C1 or radius r1 does not foul the radius R at the lip of the depression thus allowing total engagement of the projection 4 into the depression 3 to prevent air gaps resulting between the faces of the laminations in the pack.

Figure 5:
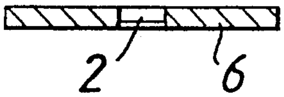
FIG. 5 is a cross-sectional view of a partitioning plate.
Figure 6:
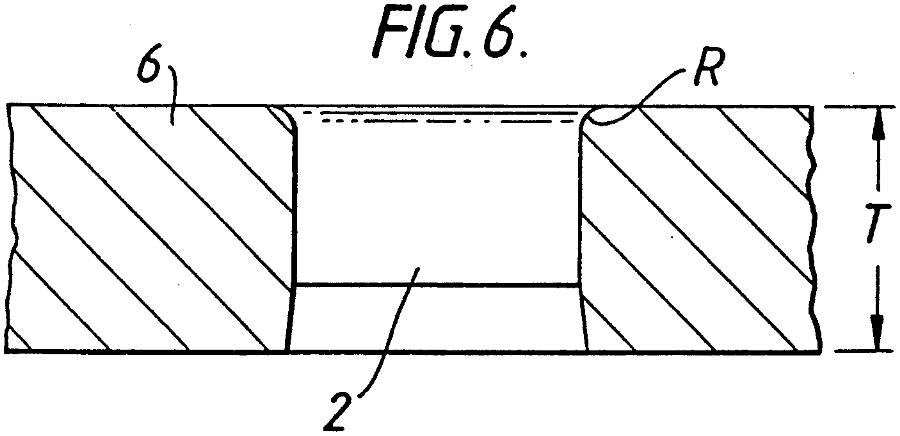
FIG. 6 is a partial cross-sectional view of the partitioning plate of FIG. 5.

Referring to FIGS. 3, 5 and 6, the hole 2 in the partitioning plate 6 has the same form as the depression 3 in the laminations except, of course, that it extends all the way through the plate 6. Thus the projection 4 of the bottom most lamination 5 fits with the partitioning plate in the same way as it would fit with a depression 3 in a lamination.

Figure 7:
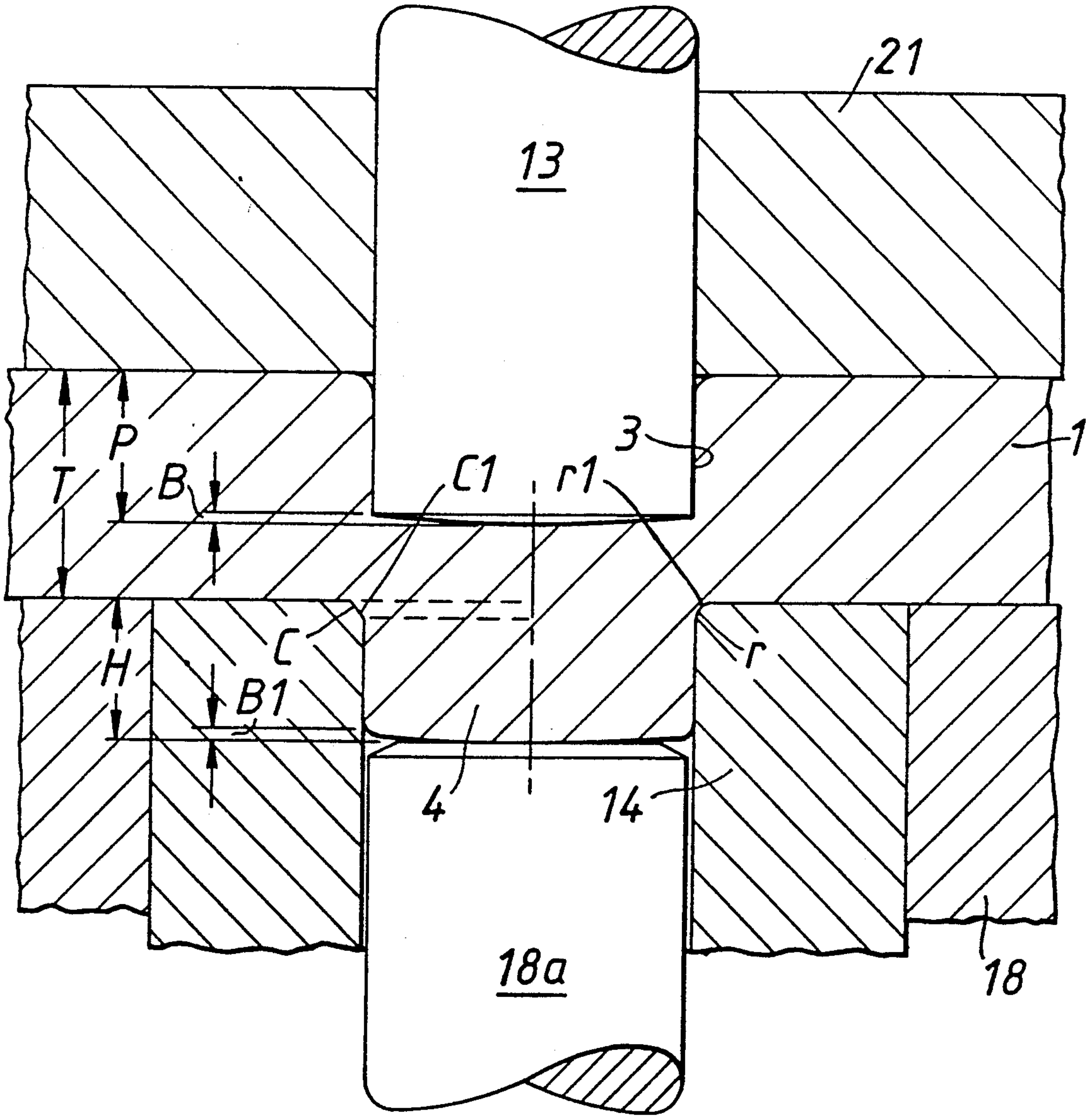
FIG. 7 is a partial cross-sectional view illustrating how a depression and projection are produced, in accordance with an aspect of the invention, in a lamination.

Referring to FIG. 7, the depression 3 and projection 4 in each lamination are produced by way of example in the following manner, in accordance with another aspect of the present invention.

Metal strip 1 is located and gripped tight in a manner to be described hereinafter over a die 14. The die defines a right circularly cylindrical opening the lip of which is either:

a) radiussed with a radius r as shown in the right hand portion of FIG. 7; or b) in the form of a truncated cone C as shown in the left hand portion of FIG. 7.

A depression form punch 13 simultaneously forms the depression 3 and causes the metal of the strip 1 to be extruded into the projection form die 14 past the cone C or radius r.

The normal shear stress fracture condition at about 50% of the metal thickness T is significantly changed, due to presence of the radius r or cone C at the lip of the die 14, to produce the depression depth P at 69% of the metal thickness T and the corresponding projection height at 65% of the thickness T without fracturing. The 4% difference between depression depth P and projection height H represents the compression and thinning of the metal during the action of being forced past the cone C or radius into the projection form die 14 providing a burnished finish to the projection circumference.

The internal diameter of the projection form die 14 is made 0.022 mm larger than the outside diameter of the depression form punch 13. The action of extruding the metal into the projection form die 14 past the cone C or radius r ensures that the depression diameter is produced 0.004 mm smaller than the diameter of the depression punch 13. This produces an interference of 0.026 mm between the fit of the projection 4 into the depression 3. The cone C or radius r applied to the lip of the projection form die 14 produces a similar size cone C1 or radius r1 at the base of the projection 4. The resultant cone C1 or radius r1 produced at the base of the projection 4 is smaller than the radius R produced at the opening of the depression 3, thus allowing full engagement of the projection 4 into depression 3 ensuring no gaps exist between the metal plates to provide a single connecting feature that can withstand the stresses previously shared by multi-connecting features.

The maximum flatness deviation B (see e.g. FIG. 3) at the base of the depression 3 and the maximum flatness deviation B1 at the top of the projection 4 is 0.008 mm.

The percentages and dimensions mentioned above are obtainable on 0.5 mm thick semi-processed and fully processed electrical steel. The percentages stated are also obtainable on 0.2 mm thick 50% nickel-iron alloy metal which may be used to produce transformer pole core packs.

The decision to use a cone C or radius r at the lip of the projection form die 14 mainly depends on the ductility of the metal of the strip 1. High ductility material will give similar percentages to those stated when either a cone C or a radius r is used. Low to medium ductility material requires a low angle cone C to give similar percentages to those stated.

In order to remove the projection 4 from the die 14, a spring loaded stripper pad 18 is used. The pad 18 may be aided by the use of a spring loaded ejector 18a which projects through the bore in the projection forming die 14. The ejector 18a would be used especially when a thin metal strip 1 is used in order to prevent distortion of the laminations. For example, the ejector 18a would be used when the thickness T of the metal strip 1 is less than 0.21 mm. The presence of the ejector 18a makes no substantial difference to the maximum flatness deviation B mentioned hereinabove.

The hole 2 in the partitioning plate 6 is made using a hole piercing punch of the same dimensions as the depression form punch 13 and the form and dimensions of the hole 2 are the same as the form and dimensions of the depression 3 except that its depth is equal to the thickness of the material. The projection 4 of the bottom most lamination 5 fits with the hole 2 in exactly the same manner as it would fit with a depression 3.

Figure 8A:
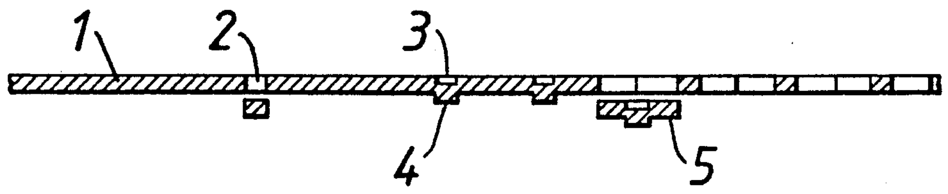
FIGS. 8A to 8C schematically illustrate a sequence of operations for making a pack of laminations.
Figure 8B:
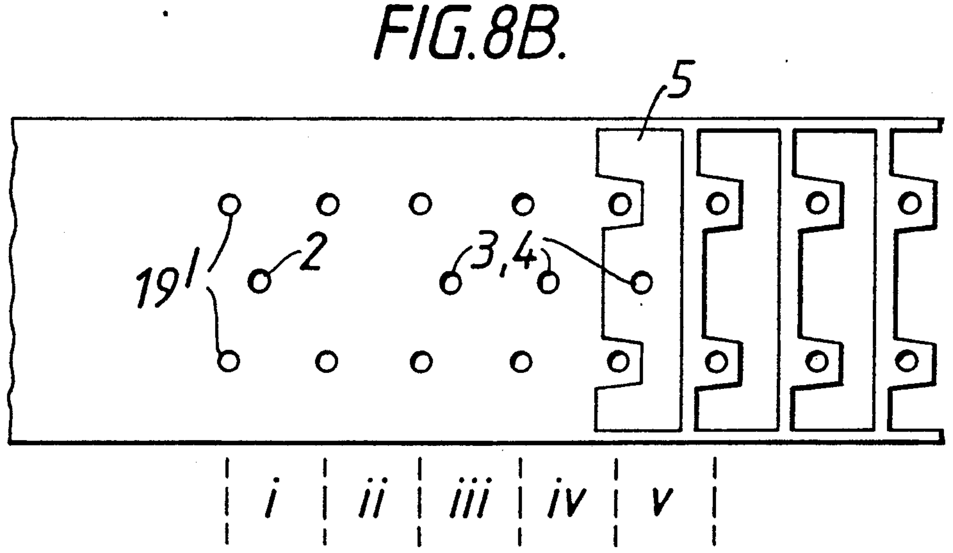
Figure 8C:
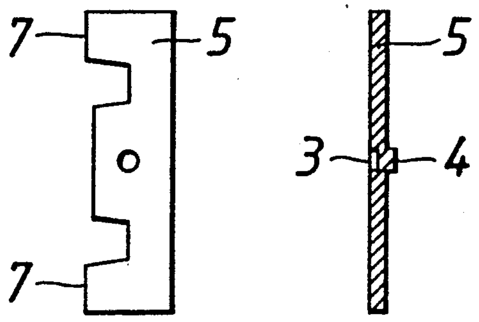

Referring to FIGS. 8A to 8C, the partitioning plate and the laminations are stamped from the metal strip 1 in a series of stages i to v. FIG. 8 shows, by way of example, the production of partitioning plates and laminations for use in a pack as shown in FIG. 1. In such a pack the single connection feature on each lamination is at the centre of the lamination.

Referring to FIGS. 8A and 8B, at stage 1 locating holes 19' displaced from the centre of the metal strip 1 are punched. These holes are used as described hereinafter for accurately locating the metal strip over the die 14. In addition, when a portion of the metal strip is to be used as a partitioning plate the hole 2 of the partitioning plate is also punched out at stage 1. Stage 2 is an idle station. At stage 3 the depression 3 and projection 4 are produced. Stage 4 is an idle station. At stage 5 the E-shaped lamination is stamped out of the strip.

The production stages illustrated in FIGS. 8A to 8C are carried out using a single multi-stage progression tool as schematically illustrated in FIGS. 9A to 9D.

Figure 9A:
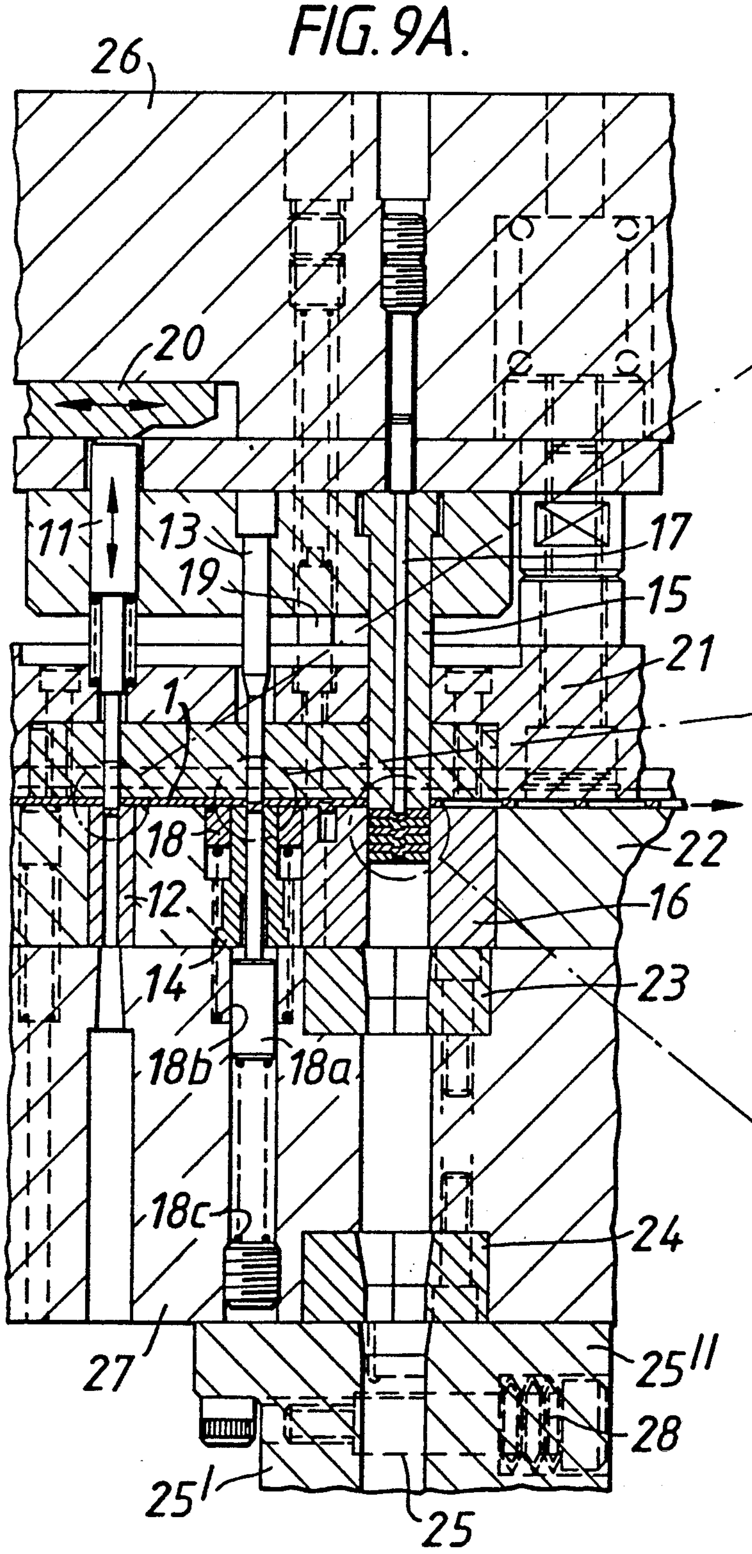
FIGS. 9 A to D are schematic cross-sectional views of apparatus for making a pack of laminations.
Figure 9B:
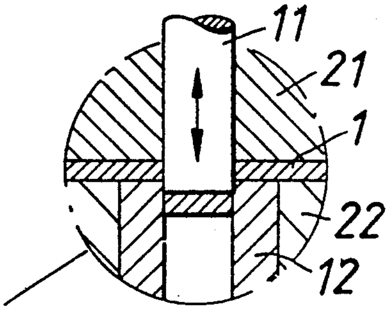

Referring to FIG. 9A, the tool comprises a male punch assembly 26 and female die assembly 27 secured in an automatic power press. In the tool the metal strip 1 is gripped tightly between a die plate 22 and stripper plate 21.

At stage 1 the locating holes 19' are produced by means not shown in FIG. 9A. The holes 2 for the partitioning plates are stamped out of the metal strip 1 by a punch 11 which cooperates with a die 12 best shown in FIG. 9B. The punch 11 is actuated when required to punch the holes by a cam 20 operated by an electro-pneumatic arrangement (not shown).

Stage 2, as mentioned above, is an idle stage.

Figure 9C:
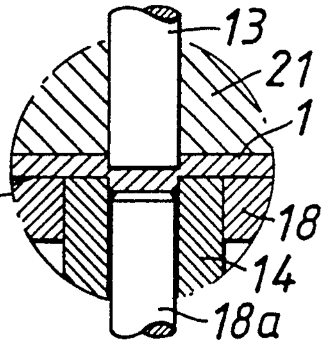

Stages 3 and 4 require to be considered together. The locating holes 19' pass through stages 1, 2 and 3 into stage 4. At stage 4 pilots 19 are inserted through the locating holes 19' to accurately locate the metal strip 1 which is also gripped tightly between the stripper plate 21 and die plate 22. At the preceeding stage 3 as best shown in FIG. 9C the die form punch forms the depression 3 and causes the metal of the strip 1 to be extruded past the cone C1 or radius r of the projection forming die 14 to form the depresssion 3 and projection 4. Once the projection 4 has been formed, the stripper pad 18, and, if provided, the ejector 18*a* operate to eject the projection from the die 14. The stripper pad 18 is biassed by a spring 18*b* and the ejector 18*a* is biassed by a spring 18*c*.

Figure 9D:
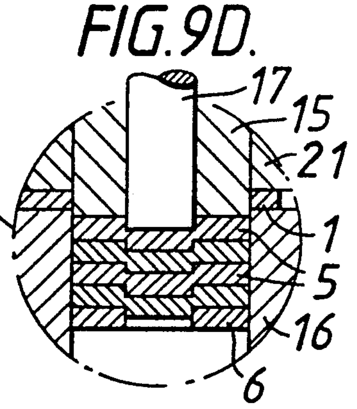

At stage 5 the laminations 5 are stamped out of the strip 1 by a punch 15 which cooperates with a die 16 as best shown in FIG. 9D. At the same time as punching out the laminations, the laminations 5 are stacked one upon the other with the projection of each lamination projecting into the corresponding depression of the adjacent lamination. For that purpose, there is additionally provided a thrust rod 17 through the punch 15. The thrust rod 17 engages with the depression on the punched out lamination. The interference fit of the projections 4 into the depressions 3 necessitates the pressure applied by the punch 15 and the thrust rod 17 being countered by a similar counter pressure. The counter pressure is progressively developed by the die 16 followed by segmented restriction blocks 23 and 24 and concluded by the adjustable pressure of a restrictor tube 25.

The restriction blocks 23 and 24 comprise apertures that are slightly smaller than the laminations and partitioning plates 6. This restricts the free passage of the pack. The aperture of block 24 is slightly smaller than that of block 23 to progressively develop the counter pressure. The tube 25 comprises two precision ground halves 25' and 25" which are spaced apart transversely of the tube 25 and urged towards each other to reduce the gap between them. The tube halves are urged towards each other by spring pressure developed by e.g. sets of disc washers (Belleville Washers) 28.

The laminations 5 are stacked up on a partitioning plate 6 as shown in FIG. 9D.

The conical or radiussed lip of the die 14 is easily redressed during tool service with a low cost fixture incorporating the appropriate redressing wheel.

The pack of laminations which is torsionally flexible with the laminations connected one to another by a single connecting feature, as described above, provides an electromagnetic device of improved electrical efficiency because of the reduction of connecting features. Furthermore, the use of a single connecting feature minimises the uninsulated contact area between neighboring magnetic pole core plates thus proportionally reducing the potential problem of eddy currents developing between the pole core plates. The torsional flexibility of the pack allows the pole faces of coupled pole core packs to butt together throughout the length of the pack, thus avoiding air gaps which can occur with rigid multi-connected packs. That minimises the disruption of the magnetic flux paths to allow improve electrical efficiency. The pack of laminations according to the embodiment of the invention offers reduced costs for providing comparable electrical efficiency as compared with rigid packs or packs made using loose plates. The reduced cost results from the avoidance of the need for higher quality electrical steel in the case of rigid packs or from the avoidance of the use of more expensive assembly equipment in the case of packs made of loose plates.

The lamination packs made in accordance with embodiments of the invention are useful in many types of electro magnetic devices and may be used for stators, chokes, transformers, etc.

We claim:

1. A stack of laminations for use magnetic core plates in an electromagnetic device, each lamination being of a non-circular configuration, being located in a plane and comprising, on a common axis perpendicular to the lamination, a single depression in one side and a single projection on the other side thereof, each lamination being coupled to an adjacent lamination only by the single projection projecting into the single depression of the adjacent lamination, the depression and projection in each lamination being circular and the depressions and projections interfitting, with a circular circumference of the projection being in coupling, torsionally flexible contact with a circular circumference of the depression which permits twisting of the laminations with respect to each other about an axis perpendicular to the plane of each lamination, while retaining substantially the same coupling fit between adjacent laminations in order to retain the laminations assembled together in the pack, so that the stack is torsionally flexible.

2. A stack according to claim 1, wherein the projection has a base which is radiussed, the depth of the depression is greater than 50% of the lamination thickness, and the height of the projection is greater than 50% of the lamination thickness but less than the depth of the depression.

3. A stack according to claim 1, wherein the depth of the depression is about 69% of the lamination thickness and the projection height is about 65% of the lamination thickness 4. A stack according to claim 1, wherein the depression has a lip which is radiussed.

5. A stack according to claim 1, wherein the projection has a base which is in the shape of a truncated cone, the depth of the depression is greater than 50% of the lamination thickness, and the height of the projection is greater than 50% of the lamination thickness but less than the depth of the depression.

6. A stack according to claim 5, wherein the depression has a lip which is radiussed.

7. A stack of laminations according to claim 1, additionally including a partitioning plate.

* * * * *